Figure 1:
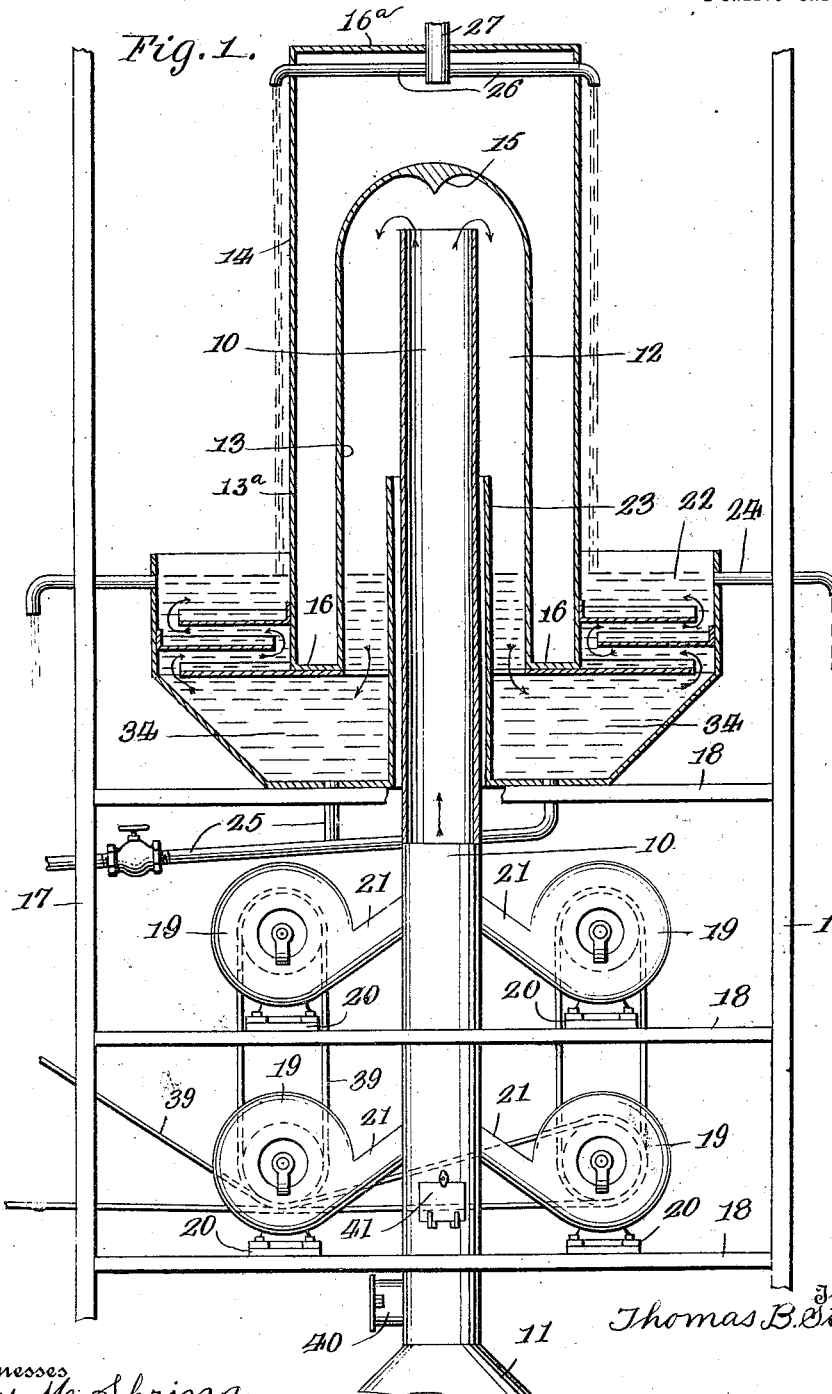

T. B. STEWART.
FUME CONDENSER.
APPLICATION FILED NOV. 30, 1914.

1,237,571.

Patented Aug. 21, 1917.
2 SHEETS—SHEET 1.

Witnesses
Guy M. Spring
C. W. P. Shewbold

Inventor
Thomas B. Stewart
By Richard B. Owen.
Attorney

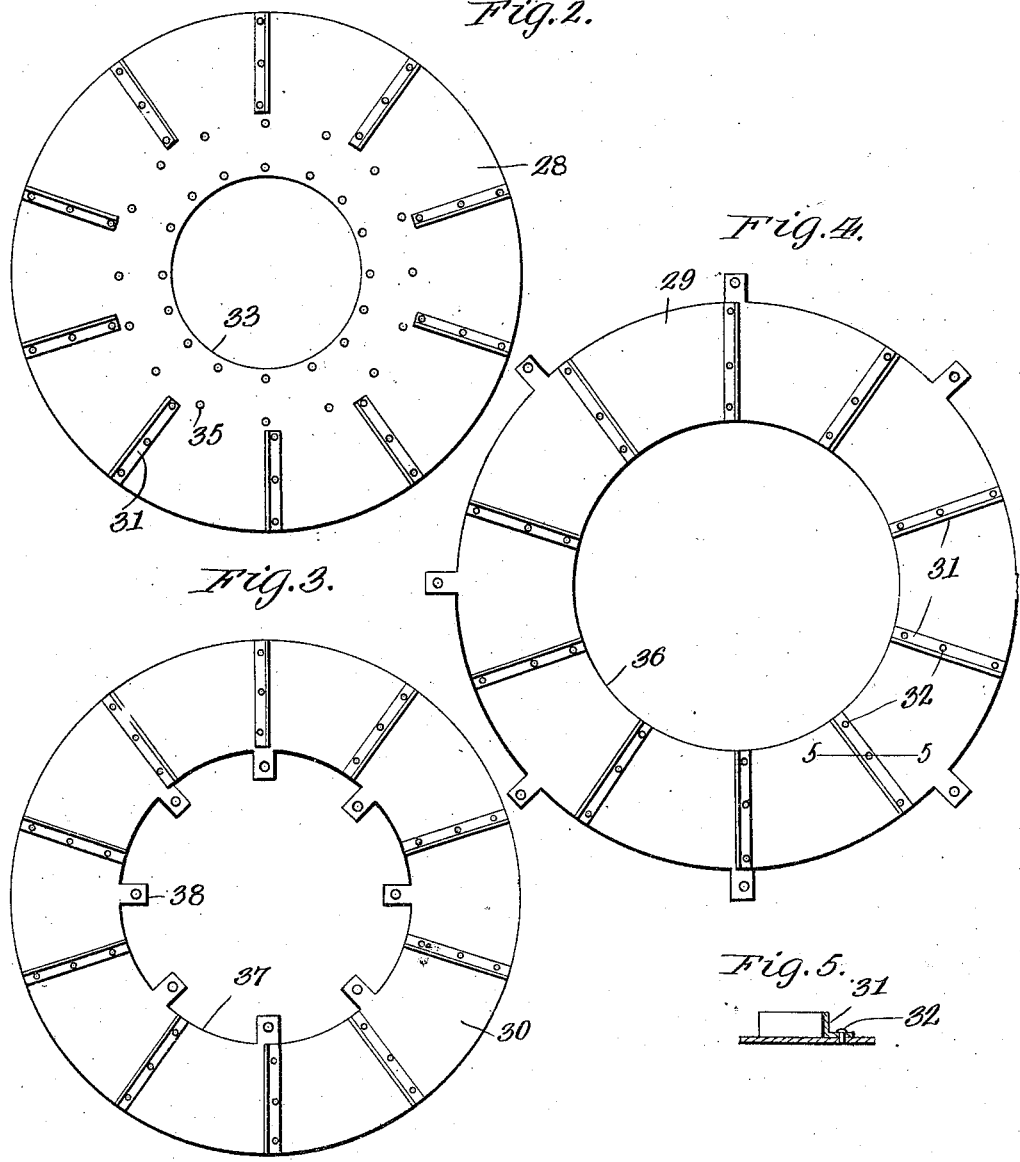

UNITED STATES PATENT OFFICE.

THOMAS B. STEWART, OF PORTOLA, CALIFORNIA.

FUME-CONDENSER.

1,237,571.   Specification of Letters Patent.   Patented Aug. 21, 1917.

Application filed November 30, 1914. Serial No. 874,863.

*To all whom it may concern:*

Be it known that I, THOMAS B. STEWART, a citizen of the United States, residing at Portola, in the county of Pulmas and State of California, have invented certain new and useful Improvements in Fume-Condensers, of which the following is a specification.

This invention relates to an apparatus for condensing smoke and the heated products arising from chimneys and more particularly relates to a fume condensing apparatus as especially applicable to smelters.

It is accordingly a principal object of this invention to provide an effective apparatus for suppressing by condensation the deleterious gases given off in the fumes or smoke arising from smelters and like furnaces.

It is also an object of this invention to provide means, which in condensing the undesirable or actually poisonous fumes will abstract therefrom all the metalliferous solids or values resulting from such condensation.

It is an object of equal importance of this invention to provide means which shall force the smoke carrying the fumes and the undeposited metallic particles against and around a series of novel baffle plates surrounded by a liquid, the latter of which serves to condense the smoke while the baffle plates arrest the progress of the solids.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:

Figure 1 is an elevational view of the apparatus comprehended by this invention positioned over the stack of a smelter, a vertical section being taken through a portion of the view, Fig. 2 is a plan view of the lowermost baffle plate, Fig. 3 is a similar view of the uppermost baffle plate, Fig. 4 is a plan view of the intermediate baffle plate, and Fig. 5 is a sectional view taken on the line 5—5 of Fig. 4.

With reference to the drawings, the numeral 10 designates the continuation of the smoke stack of a smelter 11, roast furnace or the like, such stack extending upwardly into the oppositely disposed cylindrical recess 12 formed by the inner walls 13 of an upper cap or deflector member 14, preferably formed with spaced double cylindrical walls, namely the inner wall 13 and the outer concentric wall 13$^a$, said walls being connected together at the bottom by an annular wall 16. A plate 16$^a$ is secured to the outer wall 13$^a$ at the top of the cap or deflector for closing the same, while the wall 13 terminates below the plate 16$^a$ with a hemispherical top, the inner surface of which immediately above the top of the stack 10 is of arcuate formation, as shown at 15, to deflect the smoke issuing from the stack and cause its downward dispersion through the recess 12 in an equal manner radially from the stack.

Surrounding the stack and the upper portion of the smelter 11 there is to be arranged a suitable supporting framework for this present apparatus, such framework including uprights 17 and suitable transverse braces 18, on a pair of which latter are to be supported the fan casings 19 upon their bases 20, such casings communicating obliquely with the stack 10 by means of upwardly inclined spouts 21, the spouts of each pair of fans in horizontal alinement being similarly alined in order to concentrate the air blast upon the upward traveling smoke of the stack 10.

Also supported on one of these transverse braces 18 and above the blast fans 19 is the reservoir 22 which surrounds the lower portion of the deflector 14 and which is formed with the upwardly extending hollow cylindrical stem 23 which surrounds the intermediate portion of the stack 10. Along the upper edge of this reservoir are positioned suitable overflow pipes 24 while similarly arranged in the bottom are the emptying pipes 25 of such service in the operation of this apparatus as will be presently set forth. This reservoir is adapted to be filled and maintained at an approximately constant level by means of inlet pipes 26 which are supported in the upper portion of the cap 14 and fed from a common source of suitable supply as indicated at 27.

It is proposed as a particular element of this invention to surround the stack 10, or more properly the stem 23 with a series of baffle plates of a particular construction designed to arrest the progress of any metalliferous deposits which may be contained in the fumes to be condensed within reservoir 22. These baffle plates are arranged in a stepped or staggered relation illustrated in Fig. 1 and are denoted by the numerals 28, 29 and 30 respectively in Figs. 2, 4 and 3. Each of these plates is formed from a suitable metallic material such as sheet iron which may also preferably enter into the construction of the remainder of the apparatus, and are preferably circular having secured thereto the radial baffles 31, each of which is L-shaped as indicated in Fig. 5 and secured by rivets or some other suitable means 32. The baffle plate 28 is formed with a central aperture 33 of such size as to span the lower open mouth of the recess 12 permitting the smoke deflected downwardly along the walls of this recess to enter the lower portion 34 of the reservoir 22, this baffle plate also being provided with one or more series of circumferentially alined apertures 35 adjacent the central aperture 33 in order to accommodate the necessary securing means whereby this baffle plate may be supported along the connecting wall 16 of the upper smoke deflector.

The intermediate and upper baffle plates 29 and 30, shown in Fig. 1, are similarly formed but provided with central apertures 36 and 37 of varying diameters, the former being sufficiently large as to space the inner edge of this aperture from the outer wall 13ª of the deflector cap 14 while the latter named aperture is of such size as to closely embrace this deflector 14 and be secured to its outer wall 13ª. The outer periphery of the plate 30 is spaced from the inner wall of the reservoir 22 to which the intermediate baffle plate 36 is attached in such a manner as to provide a zigzag or tortuous path of progress through the liquid in the reservoir 22 for the smoke fumes pressed onward by blasts from the fan casings 19. Integral straps 38 are provided at spaced intervals around the outer edge of the intermediate baffle and the inner edge of the uppermost baffle and are apertured to receive suitable securing means whereby these plates may be respectively secured to the inner wall of the reservoir 22 and the outer wall of the recessed deflector body 14.

From the foregoing, it should be readily apparent that the operation of the apparatus herein disclosed is in the manner described in the following.

Driving means such as belts 39 lead to a suitable source of power for the rotation of the fans (not shown upon the drawing but obviously contained within the fan casings 19) whereby a positive driving force is furnished for the upward traveling smoke from the smelter 11 through the stack 10 from which it is conducted through the liquid contained in the portion 34 of the reservoir 22 and from thence tortuously around the baffle plates 28, 29 and 30 from whence any remaining smoke may reach the surface of the liquid and so escape to the outer air. The bafflers 31 carried by the baffle plates serve to arrest any metalliferous particles which may be carried in the condensing smoke fumes as they travel over the baffle plates, these bafflers being particularly assisted by the position of the baffle plates which engenders a comparatively long path of travel over such bafflers during the forced upward progress of the condensing fumes. When it is desired to empty the reservoir 22 from its liquid which must in time become impregnated with the poisonous gases and so need freshening, the outlet pipes 25 are made use of, while the pipes 24 normally take care of any overflow which may be caused by too great an influx of fresh water from the inlets 26. In order to divert the course of the smoke from the smelter 11 so as not to permit its passage through the reservoir 22 when such emptying process is in progress, a bypass outlet for the smoke is provided below the fans 19 as indicated by the numeral 40, the smoke being diverted into this channel by the operation of a hinged damper 41 adapted to be operated to effectually block off the passage of the smoke through the upper portion of the stack. It will be understood that, owing to the condensing reservoir 22 being spaced from the stack 10, condensation of the smoke while within said stack 10 will be prevented.

While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. A fume condenser comprising a liquid reservoir, a plurality of alternating baffle plates in close parallel relation within said reservoir and adapted to be covered by liquid therein, radiating bafflers secured to one face of each baffle plate, and means for directing fumes from a furnace centrally beneath the lowermost baffle plate and final escape, after passing said baffle plates, from the top of the reservoir.

2. A fume condenser comprising a liquid reservoir, a plurality of parallel baffle plates within said reservoir and adapted to be covered by the liquid therein, said baffle plates being in spaced and staggered relation, and radiating bafflers secured to the upper face of each baffle plate, and means for directing fumes from a furnace centrally beneath the lowermost baffle plate whereafter alternately passing over said plates the fumes are permitted to escape from the top of the reservoir.

3. A fume condenser comprising a liquid reservoir, a smoke stack extending through and above said reservoir, a deflector placed over the open end of said smoke stack and opening at its lower end into said liquid reservoir, and a plurality of baffle plates submerged therein between the peripheral wall thereof and the deflector.

4. A fume condenser comprising a liquid reservoir having a central tubular extension, a smoke stack passing through said tubular extension in spaced relation therewith and terminating above the reservoir, a cylindrical deflector overlying the upper open end of said smoke stack and having its lower open end extending into the reservoir and adapted to be covered by the liquid therein, a plurality of baffle plates in the reservoir between the walls thereof and the deflector alternately connected to said parts, and radiating bafflers secured to the upper face of each baffle plate.

5. A fume condenser comprising a smoke stack, a liquid holding reservoir surrounding said stack and out of contact therewith, and a deflector cap positioned over the top of said stack and extending downwardly with the lower open end projecting into the reservoir and adapted to be continuously covered by the liquid therein.

6. A fume condenser comprising the combination with a smoke stack, of a liquid holding reservoir surrounding and spaced from said stack, a cylindrical deflector positioned over the top of said stack and opening at its lower end into said reservoir, and baffle plates in said reservoir at the bottom of said deflector in stepped relation and alternately secured to said deflector and to said reservoir.

7. A fume condenser comprising in combination with a smoke stack, of a liquid-holding reservoir surrounding and spaced from said stack, a cylindrical deflector opening at its lower end into said reservoir to conduct the smoke of the stack thereinto, baffle plates in close relation surrounding the lower end of the deflector and adapted to be covered by a liquid in said reservoir to distribute the smoke through said liquid, emptying means for said reservoir, and a liquid supply pipe adapted to be supported above the reservoir by said deflector.

8. A fume condenser comprising the combination with a smoke stack, of a reservoir surrounding and spaced from said stack and adapted to hold a liquid at constant height therein, means for deflecting the smoke from said stack into the liquid within said reservoir to condense the smoke, parallel baffle plates arranged to be covered by the liquid in the reservoir and alternately spaced from the reservoir wall and from the deflector, and means for maintaining a constant supply of liquid in said reservoir.

9. A fume condenser comprising the combination with a smoke stack, of a reservoir adapted to hold a liquid surrounding said stack and spaced therefrom to prevent condensation of the smoke while within the stack, and deflecting means over the outlet end of said stack inserted at its lower end in said reservoir to direct the smoke and gases passing through said smoke pipe into the reservoir and effect the condensation of volatilized solid matters in said smoke.

10. A fume condenser comprising the combination with a smoke stack, of a condensing liquid holding reservoir surrounding said stack and spaced therefrom to prevent condensation of smoke while within said stack, a deflector to direct the smoke and fumes emerging from said stack into said reservoir, and means for effecting the condensation of smoke within said reservoir, said means including centrally apertured baffle plates in close parallel arrangement alternately secured to said reservoir and to the deflector to provide a tortuous passage-way for the smoke.

11. A fume condenser comprising the combination with a smoke stack, of a reservoir surrounding said stack but spaced therefrom, means for maintaining liquid at a constant height in said reservoir, a deflector positioned over the mouth of said stack to direct the smoke downwardly and positively into the liquid in said reservoir, centrally apertured baffle plates surrounding said deflector, means for alternately securing said baffle plates to the outer wall of the reservoir and to said deflector, and radial bafflers secured on one side of each baffle plate to arrest and cause the deposition of metalliferous particles carried by said smoke and condensed in the reservoir.

12. A fume condenser comprising the combination with a smoke stack, of a liquid holding reservoir surrounding the same and having an upstanding central tubular portion spaced from and inclosing said smoke stack, a double shell deflector cap positioned over the upper end of the smoke stack and depending into said reservoir, a lower baffle plate secured upon the bottom of said deflector cap spaced from the outer side of said reservoir and having a central opening to permit the passage of smoke under said plate, an intermediate baffle plate secured at its outer periphery to the wall of the reservoir and having a central opening spacing it from the deflector cap, an upper baffle plate surrounding and being secured to the outer shell of said deflector cap and spaced from the outer wall of the reservoir, and a liquid supply pipe supported on the top of the deflector cap to deliver water upon said upper baffle plate.

In testimony whereof I affix my signature in presence of two witnesses.

THOMAS B. STEWART.

Witnesses:
F. R. YOUNG,
ULDENE LONG.

Copies of this patent may be obtained for five cents each, by addressing the "Commissioner of Patents Washington, D. C."